United States Patent
Lee et al.

(10) Patent No.: US 9,167,615 B2
(45) Date of Patent: Oct. 20, 2015

(54) APPARATUS AND METHOD OF CONNECTING SERVICE, ACCORDING TO USER INTENTION

(71) Applicant: Samsung Electronics Co., Ltd., Gyeonggi-do (KR)

(72) Inventors: Ji-Hye Lee, Seoul (KR); Jun-Hyung Kim, Gyeonggi-do (KR); Mayuresh Madhukar Patil, Bangalore (IN); Jong-Hyo Lee, Gyeonggi-do (KR); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 139 days.

(21) Appl. No.: 13/962,432

(22) Filed: Aug. 8, 2013

(65) Prior Publication Data

US 2014/0044114 A1     Feb. 13, 2014

(30) Foreign Application Priority Data

Aug. 8, 2012 (KR) .................. 10-2012-0086816
Apr. 1, 2013 (KR) .................. 10-2013-0035357

(51) Int. Cl.
    *H04W 76/02*     (2009.01)
    *H04W 84/12*     (2009.01)

(52) U.S. Cl.
    CPC ............ *H04W 76/023* (2013.01); *H04W 84/12* (2013.01)

(58) Field of Classification Search
    CPC .... H04W 76/023; H04W 76/02; H04W 84/12
    See application file for complete search history.

(56) References Cited

U.S. PATENT DOCUMENTS

| | | | |
|---|---|---|---|
| 2010/0223347 A1 | 9/2010 | Van Datta | |
| 2011/0149806 A1 | 6/2011 | Verma et al. | |
| 2011/0281556 A1 | 11/2011 | Choi et al. | |
| 2012/0134349 A1 | 5/2012 | Jung et al. | |
| 2012/0331031 A1* | 12/2012 | Nakagawa et al. | 709/201 |
| 2013/0185447 A1* | 7/2013 | Nagawade et al. | 709/228 |
| 2014/0010107 A1* | 1/2014 | Chikkappa et al. | 370/254 |
| 2014/0016507 A1* | 1/2014 | Han et al. | 370/254 |
| 2014/0016628 A1* | 1/2014 | McCann et al. | 370/338 |
| 2014/0314065 A1* | 10/2014 | Song et al. | 370/338 |

FOREIGN PATENT DOCUMENTS

EP     2339786     6/2011

* cited by examiner

*Primary Examiner* — Albert T Chou
(74) *Attorney, Agent, or Firm* — The Farrell Law Firm, P.C.

(57) ABSTRACT

A method and an apparatus for connecting a service, according to a user's intention are provided. The method includes determining at least one file to be transmitted through a Wireless Fidelity (Wi-Fi) Direct connection, selecting, by device discovery, a peer terminal to receive the at least one file, transmitting, to the peer terminal, a first frame including file attribute information about the at least one file, before the Wi-Fi Direct connection is established with the peer terminal, and receiving, from the peer terminal, a second frame, including information indicating whether the Wi-Fi Direct connection to the peer terminal is accepted or rejected.

17 Claims, 12 Drawing Sheets

APPARATUS AND METHOD OF CONNECTING SERVICE, ACCORDING TO USER INTENTION

PRIORITY

This application claims priority under 35 U.S.C. §119(a) to a Korean patent application filed on Aug. 8, 2012 in the Korean Intellectual Property Office and assigned Serial No. 10-2012-0086816 and Korean patent application filed on Apr. 1, 2013 in the Korean Intellectual Property Office and assigned Serial No. 10-2013-0035357, the entire disclosures of which are hereby incorporated by reference.

BACKGROUND OF THE INVENTION

1. Field of the Invention

The present invention generally relates to Wireless Fidelity (Wi-Fi) communication, and particularly, to an apparatus and method for providing service connectivity for Wi-Fi Direct communication.

2. Description of the Related Art

A typical Wi-Fi network is deployed with control equipment known as wireless Access Points (APs), i.e., Base Stations (BSs) or hot spots. The wireless APs provide service provisioning involving physical support for wired and wireless networks, bridging and routing between network equipment, and connection and release of the connection between network equipment.

Wi-Fi Direct is a technology for enabling direct communication between Wi-Fi terminals without intervention of Wi-Fi APs that support connections between Wi-Fi terminals. A Wi-Fi terminal discovers a peer Wi-Fi terminal by device discovery and detects an intended service type by service discovery, thereby establishing a connection for Wi-Fi Direct communication with the peer Wi-Fi terminal.

According to the state of the art as described above, after device discovery, the Wi-Fi terminal may determine whether the discovered peer Wi-Fi terminal supports a specific service by service discovery, for Wi-Fi Direct communication. The service discovery only supports acquisition of information about service types supported by the peer Wi-Fi terminal. Therefore, even though the transmitting terminal acquires information about the services supported by the receiving terminal, it does not have knowledge of the receiving terminal's intention as to whether it will receive a specific file from the transmitting terminal.

After allowing a device connection with the transmitting terminal, the receiving terminal does not know information (e.g. the name, file type, and the like) about the specific file until it starts to receive the file from the transmitting terminal. If the receiving terminal does not want to receive the file, the receiving terminal cancels reception of the file during file transmission after a Wi-Fi Direct connection has already been established between the transmitting terminal and the receiving terminal. Without any regard to the intention of the user of the receiving terminal, the conventional Wi-Fi Direct connection method establishes an unnecessary connection between the transmitting terminal and the receiving terminal

SUMMARY OF THE INVENTION

The present invention has been made to address at least the above-mentioned problems and/or disadvantages and to provide at least the advantages described below. Accordingly, an aspect of the present invention provides a method and apparatus according to a user intention of a receiving terminal in a Wi-Fi Direct connection setup procedure.

Another aspect of the present invention provides a method and apparatus for transmitting information about attributes of a file to be transmitted by a transmitting terminal to a receiving terminal during a Wi-Fi Direct connection setup.

Another aspect of the present invention provides a method and apparatus for communicating a user intention of a receiving terminal to a transmitting terminal during a Wi-Fi Direct connection setup.

Another aspect of the present invention provides a method and apparatus for allowing a receiving terminal to reject a Wi-Fi Direct connection setup during the Wi-Fi Direct connection setup.

In accordance with an aspect of the present invention, a method for connecting a service, according to a user's intention is provided. The method includes determining at least one file to be transmitted through a Wi-Fi Direct connection, selecting, by device discovery, a peer terminal to receive the at least one file, transmitting a first frame including file attribute information about the at least one file to the peer terminal before the Wi-Fi Direct connection is established with the peer terminal, and receiving, from the peer terminal, a second frame including information indicating whether the Wi-Fi Direct connection to the peer terminal is accepted or rejected.

In accordance with another aspect of the present invention, a method for connecting a service, according to a user's intention is provided. The method includes determining a peer terminal from which at least one file will be received through a Wi-Fi Direct connection by device discovery, receiving from the peer terminal a first frame including file attribute information about the at least one file before the Wi-Fi Direct connection is established with the peer terminal, and transmitting to the peer terminal a second frame including information indicating whether the Wi-Fi Direct connection to the peer terminal is accepted or rejected.

In accordance with another aspect of the present invention, a terminal for connecting a service, according to a user's intention is provided. The terminal includes a control unit configured to determine at least one file to be transmitted through a Wi-Fi Direct connection and to select a peer terminal to receive the at least one file by device discovery, a transmitting unit configured to transmit a first frame including file attribute information about the at least one file to the peer terminal before the Wi-Fi Direct connection is established with the peer terminal, and a receiving unit configured to receive, from the peer terminal, a second frame including information indicating whether the Wi-Fi Direct connection to the peer terminal is accepted or rejected.

In accordance with another aspect of the present invention, a terminal for connecting a service, according to a user's intention is provided. The terminal includes a control unit configured to determine a peer terminal from which at least one file will be received through a Wi-Fi Direct connection by device discovery, a receiving unit configured to receive from the peer terminal a first frame including file attribute information about the at least one file before the Wi-Fi Direct connection is established with the peer terminal, and a transmitting unit configured to transmit to the peer terminal a second frame including information indicating whether the Wi-Fi Direct connection to the peer terminal is accepted or rejected.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS
OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms used in the following description and claims are not limited to their dictionary meanings, but, are merely used to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present invention will be provided to achieve at least the above-described technical aspects of the present invention. In an implementation, defined entities may have the same names, to which the present invention is not limited. Thus, embodiments of the present invention can be implemented with same or ready modifications in a system having a similar technical background.

In an embodiment of the present invention, a transmitting terminal transmits metadata such as a note containing file information about one or more files to be transmitted, the total size of the files, the number of the files, and file items to a receiving terminal by a procedure for ascertaining a user intention of the receiving terminal during Wireless Fidelity (Wi-Fi) Direct connection setup. The receiving terminal provides the metadata received from the transmitting terminal to a user, senses a user input representing a user intention, and responds to the transmitting terminal with information about the user intention.

Figure 1:
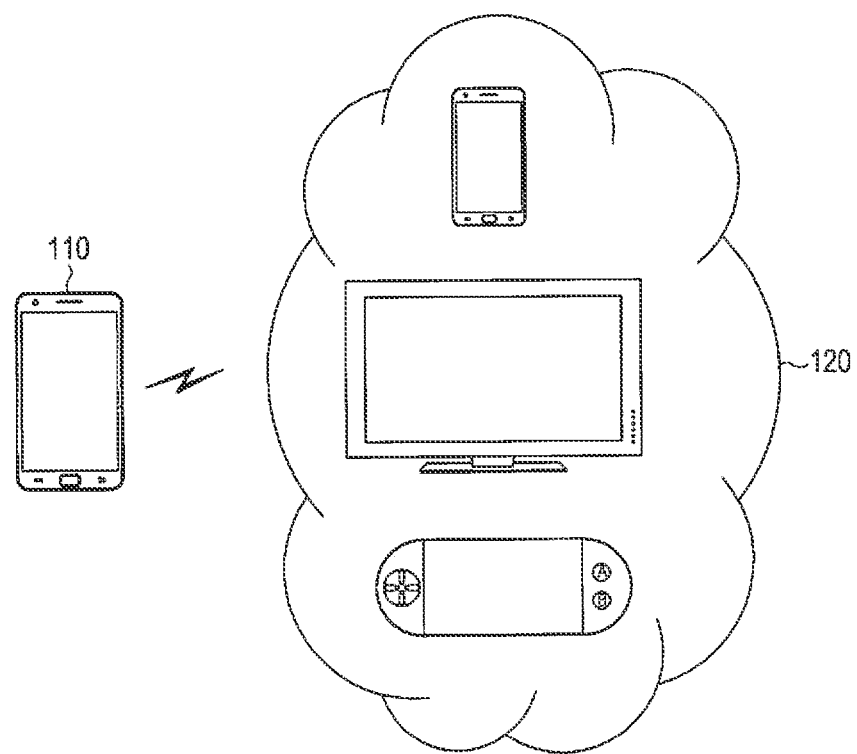
FIG. 1 illustrates a configuration of a system to which a Wireless Fidelity (Wi-Fi) Direct connection is applied according to an embodiment of the present invention.

FIG. 1 illustrates the configuration of a system to which a Wi-Fi Direct connection is applied according to an embodiment of the present invention.

Referring to FIG. 1, a transmitting terminal 110 and a receiving terminal 120 are shown. The transmitting terminal 110 is a Wi-Fi terminal that may act as both a sender and a service seeker, and each of the receiving terminals 120 is a Wi-Fi terminal that may act as both a receiver and a service advertiser. For the convenience of description, the terms 'transmitting terminal' and 'receiving terminal' are used. One or more receiving terminals 120 may exist. For example, each of the transmitting and receiving terminals 110 and 120 is an electronic device having a built-in Wi-Fi module, which may be any of various electronic devices operating in conformance to at least one of many communication protocols used for various communication systems, such as a mobile communication terminal, a smart phone, a Portable Multimedia Player (PMP), a digital broadcasting player, a Personal Digital Assistant (PDA), a music player, a display device, a portable game console, a printer, a camera, or the like. Additionally, each of the transmitting and receiving terminals 110 and 120 may be included in a large-size or mid-size terminal such as a Television (TV), a Large Format Display (LFD), a Digital Signage (DS), a media pole, a Personal Computer (PC), a laptop, a printer, or a composite device.

The Wi-Fi system may support a Wi-Fi Direct communication between the transmitting terminal 110 and a receiving terminal 120 and establish a mutual Wi-Fi connection between the transmitting terminal 110 and the receiving terminal 120 in a Direct Access (DA) mode. FIG. 1 illustrates a system configuration in which a Wi-Fi Direct connection is established between the Wi-Fi terminals 110 and 120. In this system, the Wi-Fi terminals 110 and 120, which are in proximity to each other, may establish a Wi-Fi Direct connection with each other using their built-in Wi-Fi modules or Wi-Fi modules connected to them as periphery devices without the aid of an AP.

The Wi-Fi terminals 110 and 120 may exchange information about their supported functions with each other. For example, when a user executes a Wi-Fi service-based application in the transmitting terminal 110, the transmitting terminal 110 identifies the supported function information received from the receiving terminal(s) 120. The transmitting terminal 110 may primarily select one or more receiving terminals 120 according to a predetermined criterion, for example, one or more receiving terminals 120 of the same manufacturer as that of the transmitting terminal 110, referring to the supported function information. If a plurality of receiving terminals 120 are selected, the transmitting terminal 110 may secondarily select a terminal supporting the Wi-Fi service of the application executed in the transmitting terminal 110 from among the primarily selected terminals. If a plurality of receiving terminals 120 are secondarily selected, the transmitting terminal 110 may select the best receiving terminal 120 for the Wi-Fi service according to the signal qualities, for example, signal strengths of the secondarily selected receiving terminals. The transmitting terminal 110 may request execution of a related application to the best receiving terminal 120 by transmitting information about the executed application.

While the system illustrated in FIG. 1 is configured to establish a Wi-Fi Direct connection between the Wi-Fi terminals 110 and 120 in FIG. 1, embodiments of the present invention are not limited to Wi-Fi Direct connectivity. Specifically, the embodiments of the present invention are applicable to a case where the Wi-Fi terminals 110 and 120 use Wireless Local Area Network (WLAN) and a case where the Wi-Fi terminals 110 and 120 are connected through an AP.

Figure 2:
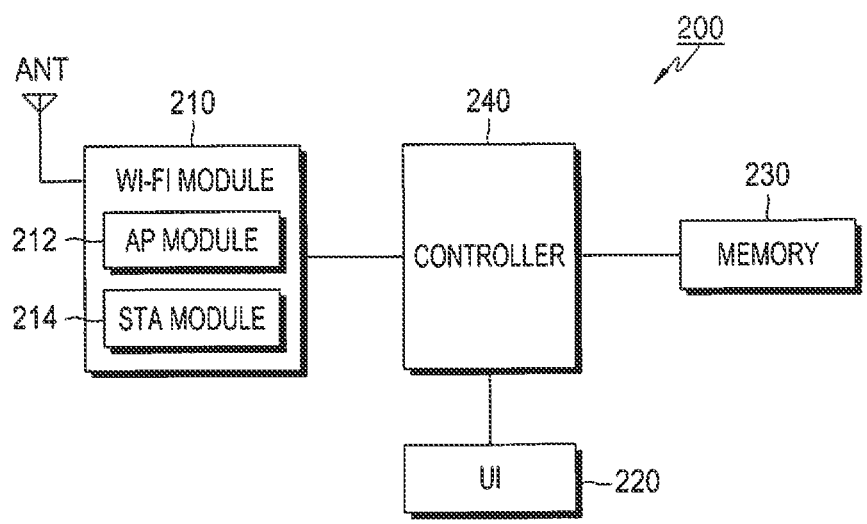
FIG. 2 is a block diagram of a Wi-Fi terminal according to an embodiment of the present invention.

FIG. 2 is a block diagram illustrating the structure of a Wi-Fi terminal according to an embodiment of the present invention. The Wi-Fi terminal structure is applicable commonly to the aforementioned transmitting and receiving terminals 110 and 120.

Referring to FIG. 2, a Wi-Fi terminal 200 includes a Wi-Fi module 210, a User Interface (UI) 220, a memory 230, and a controller 240. Besides the components, the Wi-Fi terminal 200 may further include other various components according to its configuration. For example, the Wi-Fi terminal 200 may further include at least one of (1) a display to display a screen, (2) a Radio Frequency (RF) module to perform a mobile communication function, (3) an audio processor with a microphone and a speaker, (4) a camera module to take a picture, (5) a digital broadcasting module, and (6) a Bluetooth communication module to perform a Bluetooth communication function, which will not be described and illustrated herein.

The Wi-Fi module 210 supports Internet Protocol (IP)-based wireless communication between Wi-Fi terminals. The Wi-Fi module 210 includes at least one of an AP module 212 and a Station (STA) module 214. The Wi-Fi module 210 may operate in an AP mode by waking up the AP module 212 or in a non-AP mode (i.e. an STA mode) by waking up the STA module 214 under the control of the controller 240. The non-AP mode (i.e. the STA mode) refers to a mode in which the Wi-Fi terminal functions as a terminal in providing a Wi-Fi service. For example, the non-AP mode may be a mode in which the Wi-Fi terminal 200 functions as the transmitting terminal 110 as described before with reference to FIG. 1. The AP mode refers to a mode in which the Wi-Fi terminal 200 functions as an AP in providing a Wi-Fi service.

When the Wi-Fi terminal 200 operates as a sender, the Wi-Fi module 210 transmits information about attributes of a file to be transmitted under the control of the controller 240 during the establishment of a Wi-Fi Direct connection with a peer Wi-Fi terminal. The file attribute information is used to exchange service information before a connection is established between the Wi-Fi terminals. The file attribute information may be provided to give a hint to the peer Wi-Fi terminal as to whether incoming of a service session is to be accepted or rejected. For example, in the case of a transmission service of at least one file or content, the file attribute information may include at least one of a note(s) containing information relating to the file(s), the total size of the file(s), the number of files, and the name(s) of the file(s).

When the Wi-Fi terminal 200 operates as a receiver, the Wi-Fi module 210 receives file attribute information about a file to be transmitted by the peer Wi-Fi terminal during establishing a Wi-Fi Direct connection with the peer Wi-Fi terminal and provides the received file attribute information to the controller 240. The controller 240 provides the file attribute information to a user of the Wi-Fi terminal 200 and asks the user whether or not the at least one file corresponding to the file attribute information should be received.

The UI 220 senses a user's manipulation, generates an input signal corresponding to the sensed user's manipulation, provides the input signal to the controller 240, and displays or outputs information for the user under the control of the controller 240. For this purpose, the UI 220 may include at least one of (1) one or more logical or physical buttons, (2) a display, (3) a touch screen, (4) a gesture sensing module, (5) a speaker, and (6) a microphone. More particularly, the UI 220 may include one or more input means to generate a user input signal related to execution of a Wi-Fi function for a Wi-Fi service, for example, a user input signal related to initiation of a connection setup between Wi-Fi terminals, selection of a file to be transmitted, or acceptance or rejection of file transmission. In addition, the UI 220 may include an output means to display information about a file to be received.

The memory 230 stores program codes and data that are executed and processed in the Wi-Fi terminal 200. The memory 230 may include one or more volatile memory devices and/or one or more non-volatile memory devices. For example, the memory 230 may permanently or temporarily store an Operating System (OS) of the Wi-Fi terminal 200, information and data exchanged through the Wi-Fi module 210, at least one file to be transmitted, and information about the at least one file.

The controller 240 facilitates overall control of the Wi-Fi terminal 200. The controller 240 controls operations related to execution of functions used to provide a Wi-Fi service in the Wi-Fi terminal 200. The controller 240 may also control operations related to a file transmission service in the Wi-Fi terminal 200. Specifically, the controller 240 generates file attribute information about a file to be transmitted based on the file itself and/or a user input or retrieves the file attribute information from the memory 230, and controls the Wi-Fi module 210 to transmit the file attribute information to the peer terminal. In addition, the controller 240 interprets received file attributed information about a file to be received from the peer Wi-Fi terminal, outputs the file attribute information through the UI 220, and receives information about a user intention from the UI 220. If the user does not accept the file transmission, the controller 240 commands the Wi-Fi module 210 to discontinue setup of a Wi-Fi Direct connection with the peer Wi-Fi terminal.

Operations of the controller 240 according to embodiments of the present invention will be described later in greater detail. Besides the above-described operations, the controller 240 performs control operations related to typical functions of the Wi-Fi terminal 200. For example, the controller 240 may control a communication function using a mobile communication network, when an application is executed based on the communication function. When an application having a communication function is executed, the controller 240 may also control the communication function.

Figure 3:
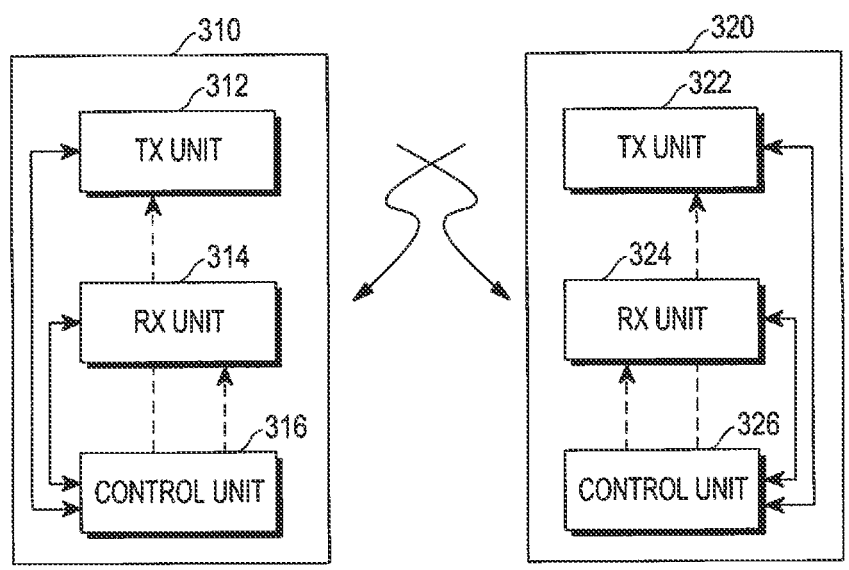
FIG. 3 is a block diagram of a transmitting terminal and a receiving terminal according to an embodiment of the present invention.

FIG. 3 is a block diagram of a transmitting terminal and a receiving terminal according to an embodiment of the present invention.

Referring to FIG. 3, in a transmitting terminal 310, a transmitting unit 312 transmits, in a predetermined message or frame, file attribute information about a file to be transmitted by the transmitting unit 312 to a receiving terminal 320 during Wi-Fi Direct connection setup. The message or frame may be a message available for a Wi-Fi Direct service, for example, a Genetic Advertisement Service (GAS) Initial Request Action frame or a Peer-to-Peer (P2P) Public Action frame.

A receiving unit 314 receives information about a user intention as to whether a user of the receiving terminal 320 will accept or reject file transmission. The user intention information may be transmitted, for example, in a GAS Initial Request Action frame or a P2P Public Action frame.

A control unit 316 determines, based on the user intention information received from the receiving terminal 320, whether to continue or discontinue the Wi-Fi connection setup with the receiving terminal 320.

In the receiving terminal 320, a receiving unit 324 receives from the transmitting terminal 310 file attribute information about a file to be transmitted by the transmitting terminal 310. A transmitting unit 322 transmits information about the user intention as to whether the user of the receiving terminal 320 will accept or reject the file transmission to the transmitting terminal 310 under the control of a control unit 326. The control unit 326 asks the user whether the transmission service from the transmitting terminal 310 should be accepted based on the received file attribute information and generates and transmits the user intention information to the transmit unit 322.

The control unit 326 may determine, based on the user intention information, whether to continue or discontinue the Wi-Fi Direct connection setup with the transmitting terminal 310.

Figure 4:
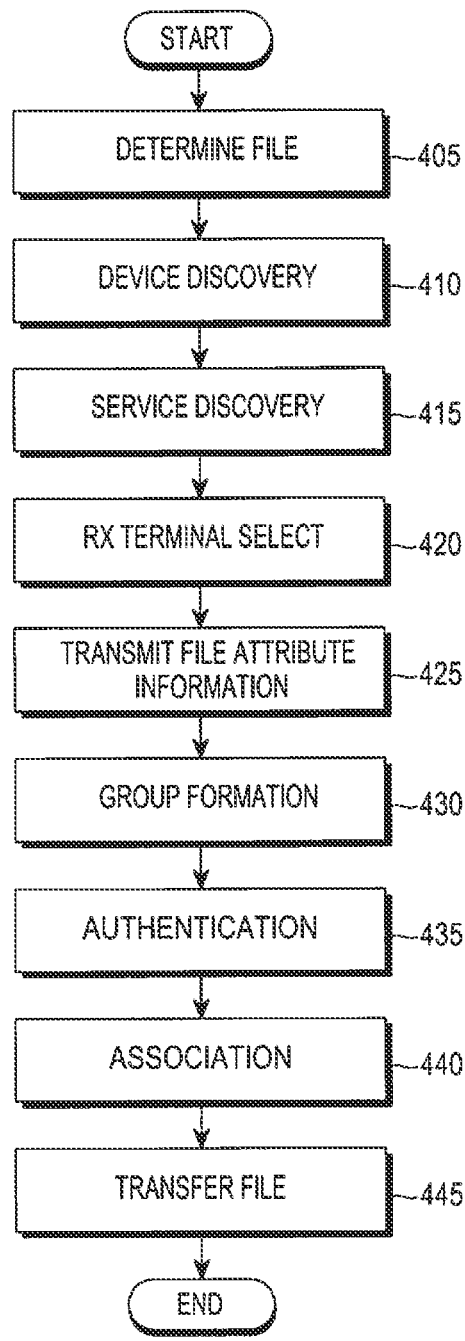
FIG. 4 is a flowchart illustrating a procedure for transmitting a file through a Wi-Fi Direct connection according to an embodiment of the present invention.

FIG. 4 is a flowchart illustrating a procedure for transmitting a file through a Wi-Fi Direct connection according to an embodiment of the present invention.

Referring to FIG. 4, a transmitting terminal determines at least one file to be transmitted in step 405 and discovers peer terminals (i.e., receiving terminals) with which to conduct Wi-Fi communication by device discovery in step 410. Once peer terminals are detected, the transmitting terminal determines a type of service to connect to a receiving terminal, for example, a Wi-Fi Direct service by service discovery in step 415. After selecting a receiving terminal to which the file will be transmitted in step 420, the transmitting terminal queries the receiving terminal to determine whether it wishes to receive the file by transmitting file attribute information about the file in step 425. If the receiving terminal responds to the query indicating that it wishes to receive the file, the transmitting terminal establishes a Wi-Fi Direct connection with the receiving terminal by group formation in step 430, authentication in step 435, and association in step 440. Subsequently, the transmitting terminal sets up a file transmission service session on the Wi-Fi Direct connection and transmits the file through the file transmission service session to the receiving terminal in step 445.

Figure 5:
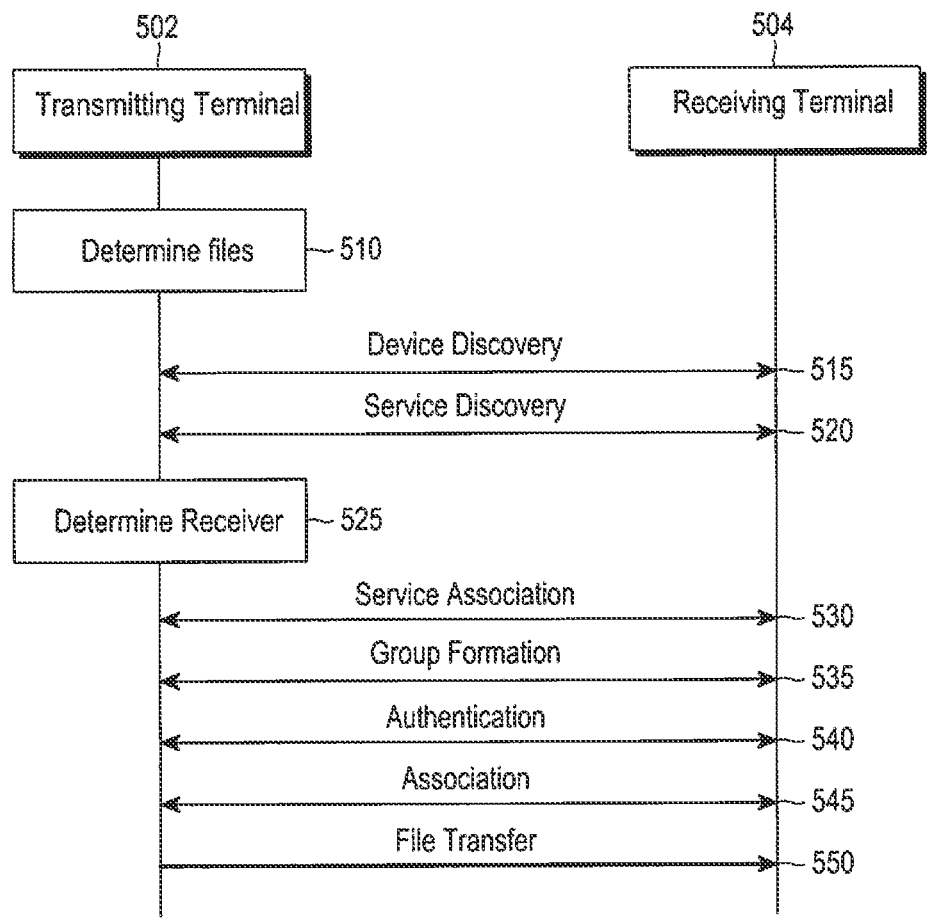
FIG. 5 is a diagram illustrating a signal flow between a transmitting terminal and a receiving terminal according to an embodiment of the present invention.

FIG. 5 is a diagram illustrating a signal flow between a transmitting terminal and a receiving terminal according to an embodiment of the present invention.

Referring to FIG. 5, a transmitting terminal 502 (i.e., a sender) determines, in step 510, at least one file to be transmitted and discovers at least one receiving terminal 504 (i.e., a receiver) to receive the file by device discovery in step 515. The transmitting terminal 502 performs service discovery with the at least one receiving terminal 504 in step 520 and identifies at least one receiving terminal 504 to receive the file in step 525.

In step 530, the transmitting terminal 502 queries the at least one receiving terminal 504 to determine whether the receiving terminal 504 will receive the file by transmitting file attribute information about the file by service association. If the at least one receiving terminal 504 responds to the query indicating that it wishes to receive the file or upon time-out without any response from the at least one receiving terminal 504, the transmitting terminal 502 forms a group with the at least one receiving terminal 504 in step 535, authenticates the at least one receiving terminal 504 of the group in step 540, and establishes a connection with the at least one receiving terminal 504 by association in step 545.

In step 550, the transmitting terminal 502 transmits the file to the receiving terminal 504 through the established connection.

As described above, the transmitting terminal 502 selects the receiving terminal 504 to receive a file from among discovered terminals by service discovery and transmits a message carrying the file attribute information to the selected receiving terminal 504. The receiving terminal 504 receives a information corresponding to the file to be transmitted by the transmitting terminal 502 and transmits a message indicating a user intention regarding reception of the file to the transmitting terminal 502. Then the transmitting terminal 502 may continue the Wi-Fi Direct connection setup with the receiving terminal 504, if the user intends to receive the file.

Figure 6:
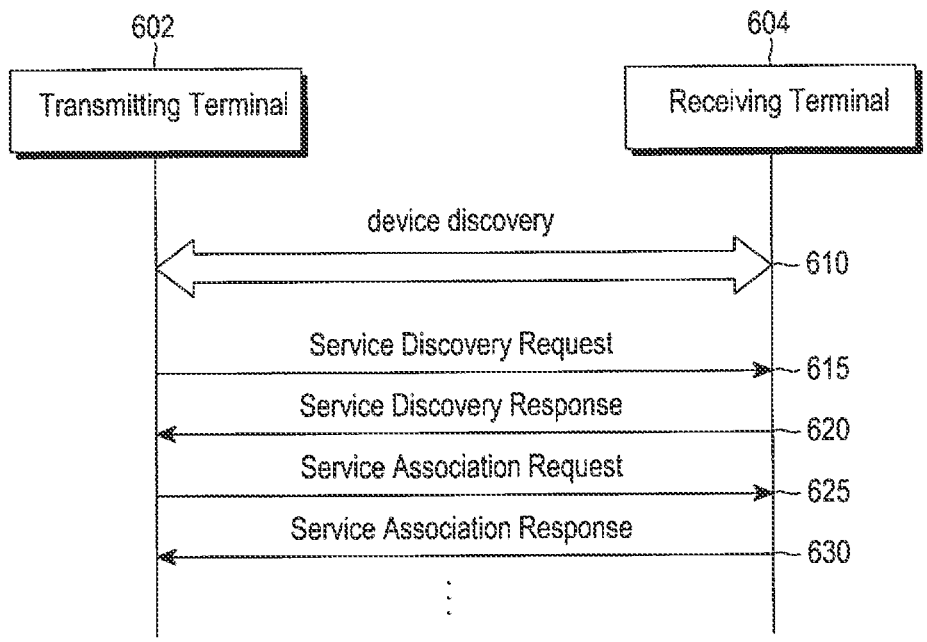
FIG. 6 is a diagram illustrating a signal flow of a procedure for transmitting file attribute information between a transmitting terminal and a receiving terminal according to an embodiment of the present invention.

FIG. 6 is a diagram illustrating a signal flow of a procedure for transmitting file attribute information between a transmitting terminal and a receiving terminal according to an embodiment of the present invention.

Referring to FIG. 6, after a transmitting terminal 602 discovers a receiving terminal 604 by device discovery in step 610, the transmitting terminal 602 transmits a Service Discovery Request to the receiving terminal 604, for service discovery in step 615. In step 620, the receiving terminal 604 transmits a Service Discovery Response to the transmitting terminal 602.

After selecting the receiving terminal 604 to receive the file, the transmitting terminal 602 transmits a Service Association Request including file attribute information about the file to the receiving terminal 604 in step 625. The receiving terminal 604 transmits a Service Association Response indicating a user intention to the transmitting terminal 602 in step 630.

The file attribute information may be transmitted in a GAS Initial Request Action frame or a P2P Public Action frame.

In an embodiment of the present invention, the GAS Initial Request Action frame may be configured to include at least one of the fields listed in Table 1 below. Table 1 illustrates the configuration of a Vendor Specific content of GAS Initial Request frame as a GAS Initial Request Action frame.

TABLE 1

| Field Name | Size (octets) | Value | Description |
| --- | --- | --- | --- |
| OUI Subtype | 1 | 0x10 | WFA OUI Subtype indicates Service Associated Frame |
| Service Protocol Type | 1 | 0x05 | Service protocol types |

TABLE 1-continued

| Field Name | Size (octets) | Value | Description |
| --- | --- | --- | --- |
| Length | 2 | Variable | Length of the Service Request Information |
| Service Transaction ID | 1 | Variable | Service transaction ID is a non-zero value used to match the Service Request/Response |
| Service Request Information | Variable | Variable | Include the Metadata |

Referring to Table 1, the OUI Subtype field indicates a Wi-Fi Alliance (WFA) Organizationally Unique Identifier (OUI) subtype indicating this frame. The Service Protocol Type field indicates a type of protocol in a wireless environment in which the frame is transmitted and received. For example, if the Service Protocol Type field is '00000000'; it indicates 'All Service Protocol Type.' If the Service Protocol Type field is '00000001'; it indicates 'Bonjour.' If the Service Protocol Type field is '00000010'; it indicates 'Universal Plug and Play (UPnP).' If the Service Protocol Type field is '00000011'; it indicates 'Web Service Discovery (WSDiscovery).' If the Service Protocol Type field is '11111111,' it indicates 'Vendor Specific.' In an embodiment of the present invention, the Service Protocol Type may be set to '00000101' in order to indicate Wi-Fi Direct service.

The Length field specifies the total size of the message and the Service Transaction ID field is set to a non-zero value in order to match a Service Request with its corresponding Service Response.

The Service Request Information field provides metadata related to a file to be transmitted.

In an embodiment of the present invention, the Service Request Information field is configured to include at least one of the fields listed in Table 2.

TABLE 2

| Field | Size | Interpretation |
| --- | --- | --- |
| Note | 128 | Free text interpreted in ASCII format |
| Size | 4 | Total size in Kbs |
| No of Items | 2 | Number of items included |
| Item | 133 | Metadata (shown in Table 3) |

Referring to Table 2, the Note field provides the free text of a description of a file(s) to be transmitted in the format of American Standard Code for Information Interchange (ASCII). The Size field specifies the total size of the file(s) to be transmitted, the No of Items field indicates the number of file items to be transmitted, and the Item field provides metadata describing each file item.

The Item field illustrated in Table 2 is configured to include at least one of the fields listed in Table 3.

TABLE 3

| Field | Size | Interpretation |
| --- | --- | --- |
| Name | 128 | File Name |
| Size | 4 | Total size in Kbs |
| Type | 1 | Bit 0: 1 file or 0 folder Bit 1: 7 Reserved |

Referring to Table 3, the Name field indicates the name of a file to be transmitted, the Size field specifies the size of the file, and the Type field indicates the type of content to be transmitted, for example, file or folder.

A response frame to the GAS Initial Request Action frame may be configured to include at least one of the fields listed in Table 4. Specifically, Table 4 illustrates the configuration of a Vendor Specific content of GAS Initial Response frame.

TABLE 4

| Field Name | Size (octets) | Value | Description |
| --- | --- | --- | --- |
| OUI Subtype | 1 | 0x10 | WFA OUI Subtype indicates Service Associated Frame |
| Service Protocol Type | 1 | 0x05 | Service protocol types |
| Length | 2 | Variable | Length of the Service Request Information |
| Service Transaction ID | 1 | Variable | Match request/response |
| Status Code | 1 | 0x00-0xff | 0: Accepted by the receiver 4: Rejected by the receiver |
| Service Response Information | Variable | | Additional information in response to Service Association Request |

Referring to Table 4, the Status Code field indicates whether file transmission is accepted ("0") or rejected ("4") by the receiving terminal. The Service Response Information field provides additional information in response to a Service Association Request, having a configuration as illustrated in Table 5.

TABLE 5

| TransportInfo | Variable | Protocol information: port number (e.g., "top: 1234") |
| --- | --- | --- |

In another embodiment of the present invention, the P2P Public Action Frame may be configured to include at least one of the fields listed in Table 6. A P2P Provision Discovery Request frame, which is a type of the P2P Public Action Frame, may carry file attribute information.

TABLE 6

| Field | Size (octets) | Value (Hexadecimal) | Description |
| --- | --- | --- | --- |
| Category | 1 | 0x7F | IEEE 802.11 vendor specific usage |
| OUI | 3 | 50 6F 9A | WFA specific OUI |
| OUI type | 1 | 0x09 (to be assigned) | Identifying the type or version of action frame. Setting to 09 indicates Wi-Fi P2P v1.0 |
| OUI Subtype | 1 | 0x0A (to be assigned) | Service Association Request (to be assigned) |
| Dialog Token | 1 | | When set to a non-zero value, used to identify the request/response transaction |
| Elements | variable | | Should include the Metadata |

Referring to Table 6, the Category, OUI, OUI type, and OUI Subtype fields are information areas set according to the type of the frame. The Dialog Token field is set by the transmitting terminal in order to identify a transaction of a Service Request and a Service Response.

The Elements field provides metadata related to a file to be transmitted according to an embodiment of the present invention. For example, the Elements field is configured to include at least one of the fields listed in Table 7.

TABLE 7

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets |
| OUI | 3 | 50 6F 9A | WFA Specific OUI |
| OUI Type | 1 | 0x09 | Identifying the type or version of P2P IE. Setting to 0x09 indicates Wi-Fi P2P v1.0 |
| Service Attributes | Variable | | Service specific attributes (to be defined) |

Referring to Table 7, the Element ID, Length, OUI, and OUI Type fields are information areas set according to the type of the Elements field. The Service Attributes field indicates the service specific attributes of the file to be transmitted according to an embodiment of the present invention.

In an embodiment of the present invention, the Service Attributes field of Table 7 is configured to include at least one of the fields listed in Table 8.

TABLE 8

| Field | Size (octets) | Value (Hexadecimal) | Description |
|---|---|---|---|
| Attribute ID | 1 | 0x13 | Identifying the type of Attribute (META DATA) |
| Length | 2 | Variable | Length of the following fields in the sub-element |
| Attribute Body | Variable | | Attribute Body |

In Table 8, the Attribute Body field includes file attribute information about the file to be transmitted. In an embodiment of the present invention, the Attribute Body field includes at least one of the fields listed in Table 9.

TABLE 9

| Field | Size | Interpretation | Optional/ Mandatory (O/M) |
|---|---|---|---|
| Note | 128 | Free text interpreted in ASCII format | M |
| Size | 4 | Total size in Kbs | M |
| No Of Items | 2 | Number of items included | M |
| Item | 133 | Metadata (shown in Table 10) | O |

Referring to Table 9, the Note field provides the free text of a description of a file(s) to be transmitted in the ASCII format. The Size field specifies the total size of the file(s) to be transmitted, the No of Items field indicates the number of file items to be transmitted, and the Item field provides metadata describing each file item.

The Item field of Table 9 is configured to include at least one of the fields listed in Table 10.

TABLE 10

| Field | Size | Interpretation |
|---|---|---|
| Name | 128 | File Name |
| Size | 4 | Total size in Kbs |
| Type | 1 | Bit 0: 1 file or 0 folder Bit 1: 7 Reserved |

Referring to Table 10, the Name field indicates the name of a file to be transmitted, the Size field specifies the size of the file, and the Type field indicates the type of content to be transmitted (e.g., file or folder).

Table 11 and Table 12 illustrate examples of file attribute information included in the Attribute Body field. Table 11 illustrates an example of file attribute information, when the Item field is not included, and Table 12 illustrates an example of file attribute information, when the Item field is included.

TABLE 11

Note: "wedding photos"
Size: 4000
No Of Items: 20

TABLE 12

Note: "wedding photos"
Size: 200
No Of Items: 1
Name: abcd.jpg
Size: 200
Type: 0x01 file A response frame to the P2P Public Action Frame may be configured to include at least one of the fields listed in Table 13.

TABLE 13

| Field | Size (octets) | Value (Hexadecimal) | Description |
|---|---|---|---|
| Category | 1 | 0x7F | IEEE 802.11 vendor specific usage (IEEE Std 802.11-2007 [1] Table 7-24). |
| OUI | 3 | 50 6F 9A | WFA specific OUI. |
| OUI type | 1 | 0x09 (to be assigned) | Identifying the type or version of action frame. Setting to 09 indicates Wi-Fi P2P v1.0. |
| OUI Subtype | 1 | 0x0B (to be assigned) | Service Association Response (to be assigned) |
| Dialog Token | 1 | | When set to a non-zero value, used to identify the request/response transaction. |
| Elements | variable | | Response information Status code and other information |

Referring to Table 13, the Elements field includes response information indicating whether file transmission is accepted or rejected, a status code, and/or other information.

While it has been described in the above embodiments of the present invention that file attribute information is transmitted by service association after device discovery and service discovery, it may be further contemplated as an alternative embodiment that a transmitting terminal transmits file attribute information in a message exchanged with a receiving terminal in an overall service setup procedure including service discovery, group formation, authentication, and file transfer and ascertains a user's intention of a receiving terminal by receiving a response message.

Figure 7:
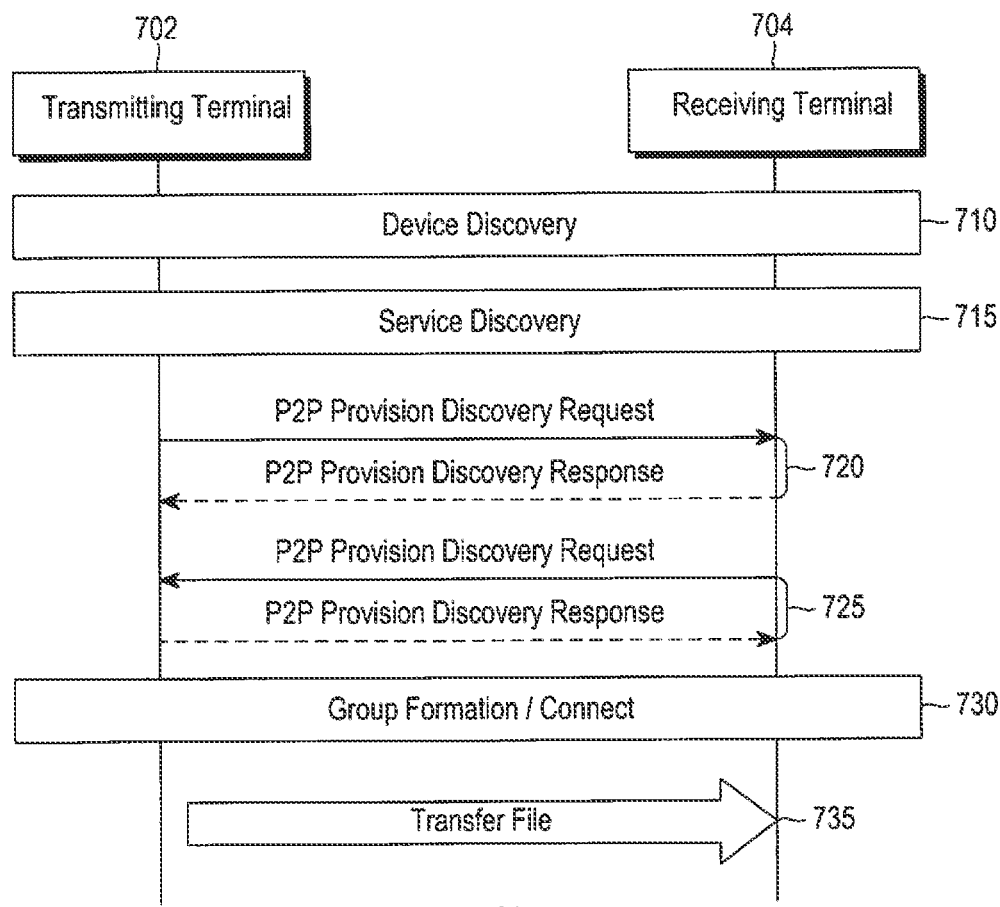
FIG. 7 is a diagram illustrating a signal flow of a procedure for transmitting file attribute information between a transmitting terminal and a receiving terminal according to another embodiment of the present invention.

FIG. 7 is a diagram illustrating a signal flow of a procedure for transmitting file attribute information between a transmitting terminal and a receiving terminal according to another embodiment of the present invention.

Referring to FIG. 7, a transmitting terminal 702 discovers at least one adjacent terminal by device discovery in step 710. In step 715, the transmitting terminal 702 acquires information about the name of a service to be provided, information about the service, and the like by service discovery and selects at least one receiving terminal 704, from among the discovered at least one terminal, to which at least one file is to be transmitted.

In step 720, the transmitting terminal 702 transmits to the receiving terminal 704 a P2P Provision Discovery Request frame including file attribute information about the at least one file to be transmitted and information about the number, total size, and name of the at least one file. The receiving terminal 704 may transmit a P2P Provision Discovery Response frame indicating successful reception of the P2P Provision Discovery Request frame to the transmitting terminal 702. In an embodiment of the present invention, the P2P Provision Discovery Response frame may include a status code indicating procedure deferral until information about a user intention is transmitted. This is because the receiving terminal 704 may await reception of a user input.

If a single file is to be transmitted, the Attributes field indicates the name of the file. If multiple files are to be transmitted, the Attributes field may include the name of at least one file selected from among the files. The at least one file may be selected by the user or according to implementation, for example, a file having the largest size. If a user transmits a plurality of files in a container, the Attributes field may include the name of the container instead of a file name.

The receiving terminal 704 may check text included in the Attributes field in a predetermined scheme such as Universal Transformation Format (UTF)-8 and display the text (i.e. the number, size, and name(s) of the file(s)) on a UI. Upon detection of a user input indicating that a service session for file transfer is accepted or rejected on the UI, the receiving terminal 704 transmits a P2P Provision Discovery Request frame including a status code indicating accept or reject to the transmitting terminal 702 in step 720. If the receiving terminal 704 has not detected a user input before time-out of a predetermined time, the receiving terminal 704 may set the status code to accept or reject according to a pre-setting. The transmitting terminal 702 may transmit, to the receiving terminal 704, a P2P Provision Discovery Response frame indicating successful reception of the P2P Provision Discovery Request frame. In an alternative embodiment, if the transmitting terminal 702 has not received a response before time-out of a predetermined time after transmitting the request frame in step 720, it may determine that the receiving terminal 704 has rejected the service session.

If the service session is accepted, the transmitting and receiving terminals 702 and 704 perform group formation and session setup in step 730 and the transmitting terminal 702 transmits the file(s) to the receiving terminal 704 through the service session in step 735.

Figure 8:
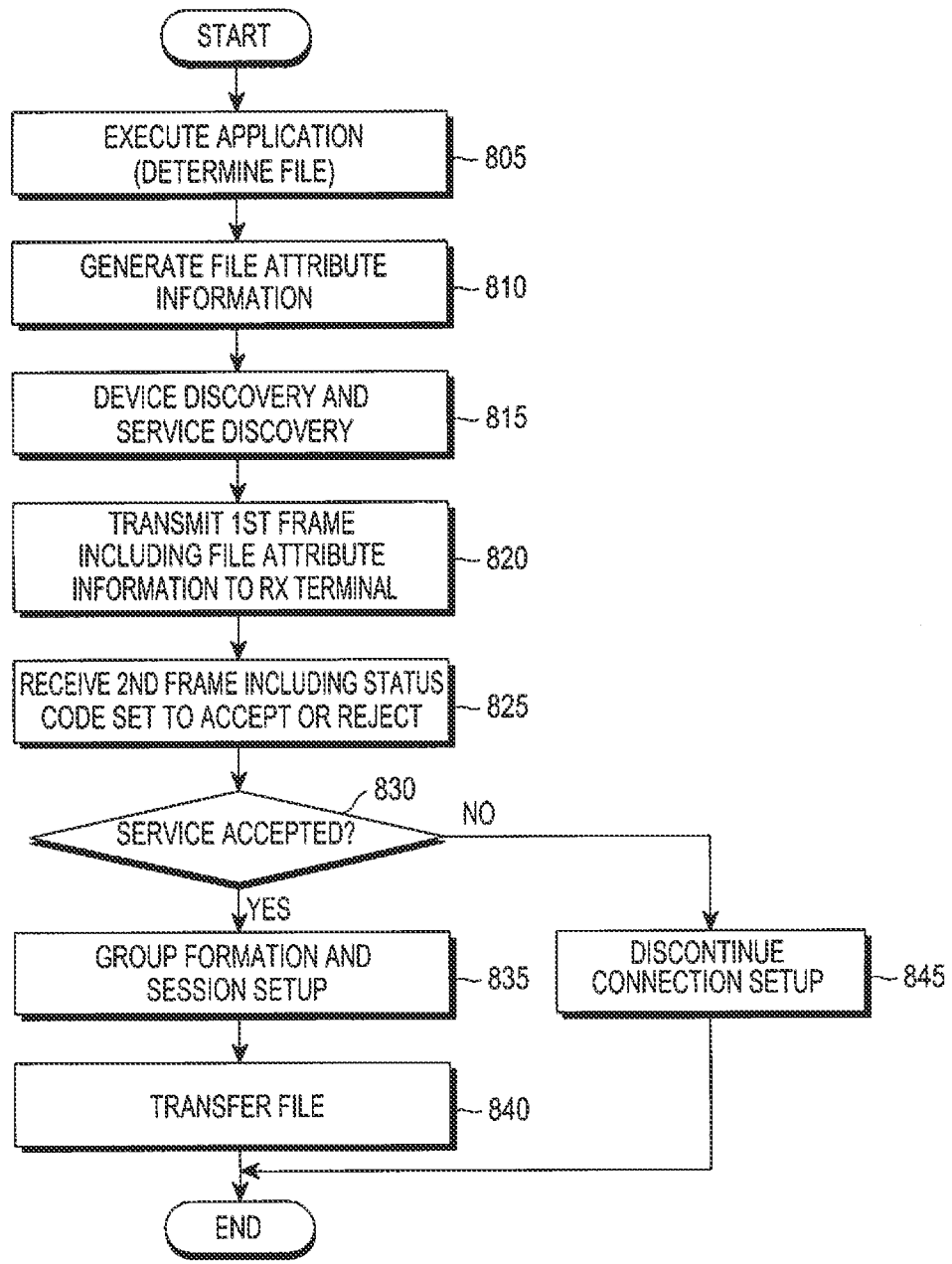
FIG. 8 is a flowchart illustrating an operation of a transmitting terminal according to an embodiment of the present invention.

FIG. 8 is a flowchart illustrating an operation of a transmitting terminal according to an embodiment of the present invention.

Referring to FIG. 8, in step 805, the transmitting terminal executes an application to implement a Wi-Fi Direct service and determines a file to be transmitted. In step 810, the transmitting terminal generates file attribute information about the file based on the file itself or an additional user input. The transmitting terminal selects a receiving terminal to receive the file by device discovery and service discovery in step 815. Steps 810 and 815 may be performed in parallel irrespective of their order. The transmitting terminal transmits a first frame including the file attribute information to the receiving terminal in step 820 and receives a second frame including a status code indicating acceptance or rejection of the file transmission service from the receiving terminal in step 825.

The transmitting terminal determines whether the received status code indicates acceptance or rejection of the file transmission service in step 830. If the status code indicates acceptance of the file transmission service, the transmitting terminal proceeds to step 835. If the status code indicates rejection of the file transmission service, the transmitting terminal goes to step 845. While not shown, if the transmitting terminal has not received the second frame within a predetermined time period after transmitting the first frame, the transmitting terminal may go to step 845, interpreting this scenario as a rejection of the file transmission service.

The transmitting terminal completes group formation and session setup in a predetermined procedure in step 835 and transmits the file in an established session in step 840.

In step 845, the transmitting terminal discontinues the service connection setup procedure and notifies the user that the receiving terminal has rejected transmission of the file. For example, the transmitting terminal may display a text message "file reception not accepted" on a screen.

Figure 9:
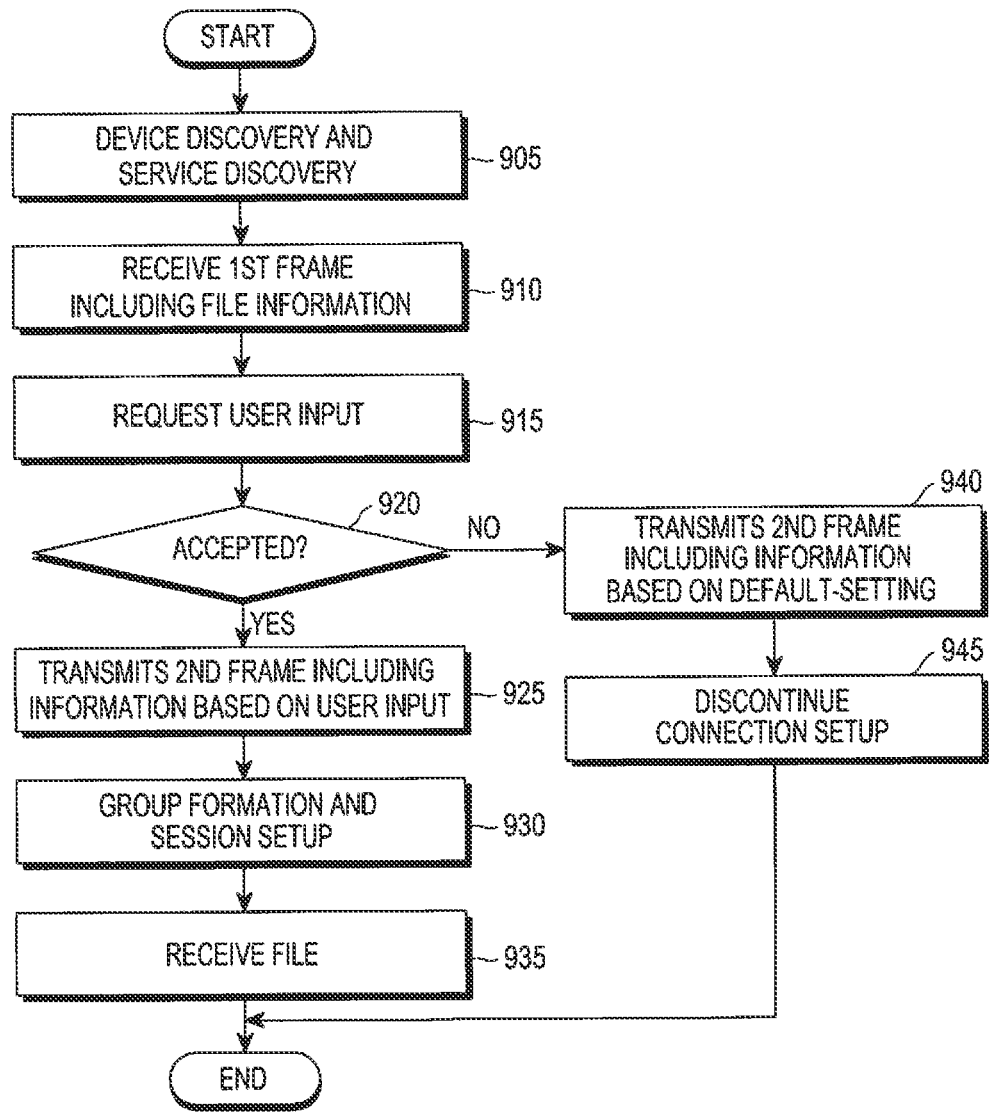
FIG. 9 is a flowchart illustrating an operation of a receiving terminal according to an embodiment of the present invention.

FIG. 9 is a flowchart illustrating an operation of a receiving terminal according to an embodiment of the present invention.

Referring to FIG. 9, in step 905, the receiving terminal detects a transmitting terminal that wants to set up a service session for a file transmission service by device discovery and service discovery to implement a Wi-Fi Direct service. In step 910, the receiving terminal receives, from the transmitting terminal, a first frame including file attribute information about a file(s) to be transmitted by the transmitting terminal. After activating an application for the Wi-Fi Direct service when needed, the receiving terminal provides file information based on the file attribute information to a user in step 915. For example, the receiving terminal may display at least one of a note containing information relating to the file(s) to be transmitted by the transmitting terminal and the total size, number, and name(s) of the file(s) on a screen and ask the user whether the user wishes to accept or reject the file transmission service.

In step 920, the receiving terminal determines whether a user input has been received. Upon detection of a user input indicating acceptance of the file transmission service, the receiving terminal proceeds to step 925. Upon detection of a user input indicating rejection of the file transmission service or in the absence of a user input until time-out, the receiving terminal proceeds to step 940.

In step 925, the receiving terminal transmits, to the transmitting terminal, a second message including a status code indicating acceptance of the file transmission service. After group formation and session setup in step 930, the receiving terminal receives the file(s) from the transmitting terminal in step 935. When the file(s) are completely received, the session may be terminated automatically.

In step 940, the receiving terminal transmits a second message including a status code indicating rejection of the file transmission service based on a default setting. In step 945, the receiving terminal discontinues the service connection setup procedure.

Figure 10:
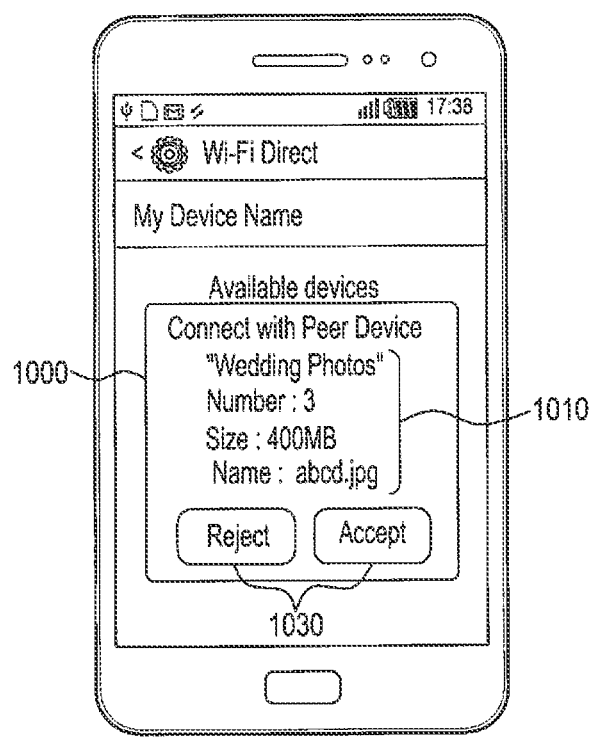
FIG. 10 illustrates a screen that displays a message asking about a user intention of a receiving terminal according to an embodiment of the present invention.

FIG. 10 illustrates a screen displaying a message asking about a user's intention according to an embodiment of the present invention.

Referring to FIG. 10, a receiving terminal displays at least a part 1010 of file attribute information received from a transmitting terminal on a service screen 1000 for a Wi-Fi Direct connection and at least one soft button 1030 to allow a user to select acceptance or rejection of a file transmission service. For example, "Wedding Photos, Number: 3, Size: 400 MB, Name: abcd.jpg" is displayed. The user may accept or reject the file transmission service by selecting one of the soft buttons 1030.

Figure 11:
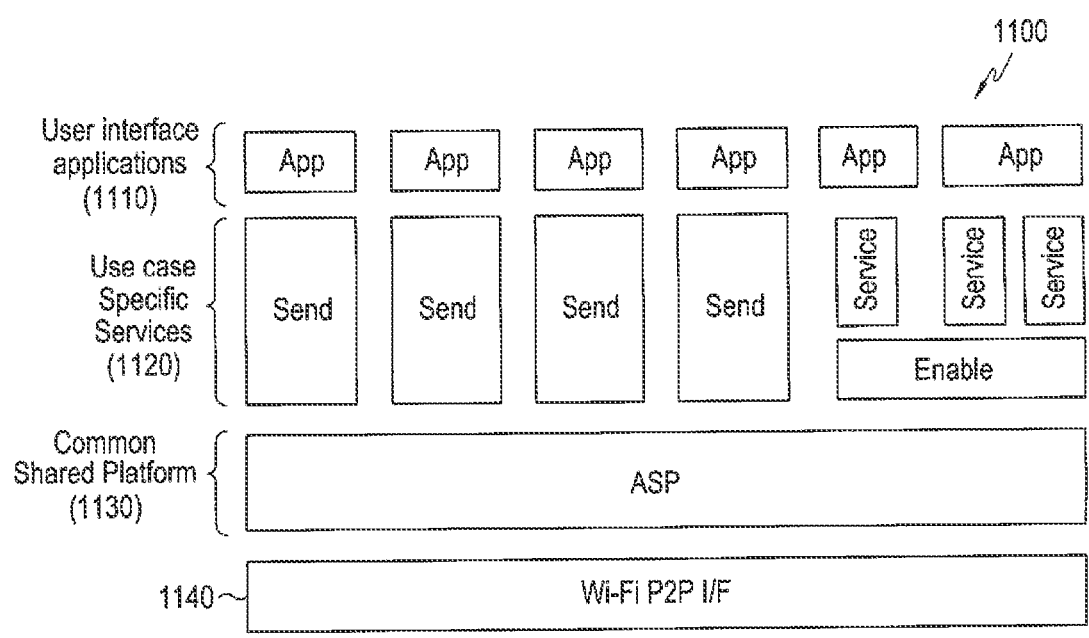
FIG. 11 illustrates a framework for a Wi-Fi Direct service according to an embodiment of the present invention.

FIG. 11 illustrates a framework for a Wi-Fi Direct service according to an embodiment of the present invention.

Referring to FIG. 11, a framework 1100 includes UI applications 1110, service processes 1120, an Application Service Platform (ASP) 1130, and a Wi-Fi P2P interface 1140.

The UI applications 1110 are applications that support the Wi-Fi connection service. The service processes 1120 provide standardized functionalities for the types of services to be connected, i.e. play, send, display, and print services. A service process 1120 of one terminal may communicate with a similar process of at least one peer terminal through a common protocol and the ASP 1130.

The ASP 1130 is a logical entity that performs common functions needed for, e.g., play, send, display, and print services. The common functions include at least one of service and device discovery, session management, access topology management, and security. The ASP 1130 establishes a logical link (i.e., an ASP session) with the ASP of a peer terminal. To initiate an ASP session, a P2P connection needs to be established between terminals. The P2P connection is created by the P2P interface 1140.

Figure 12A:
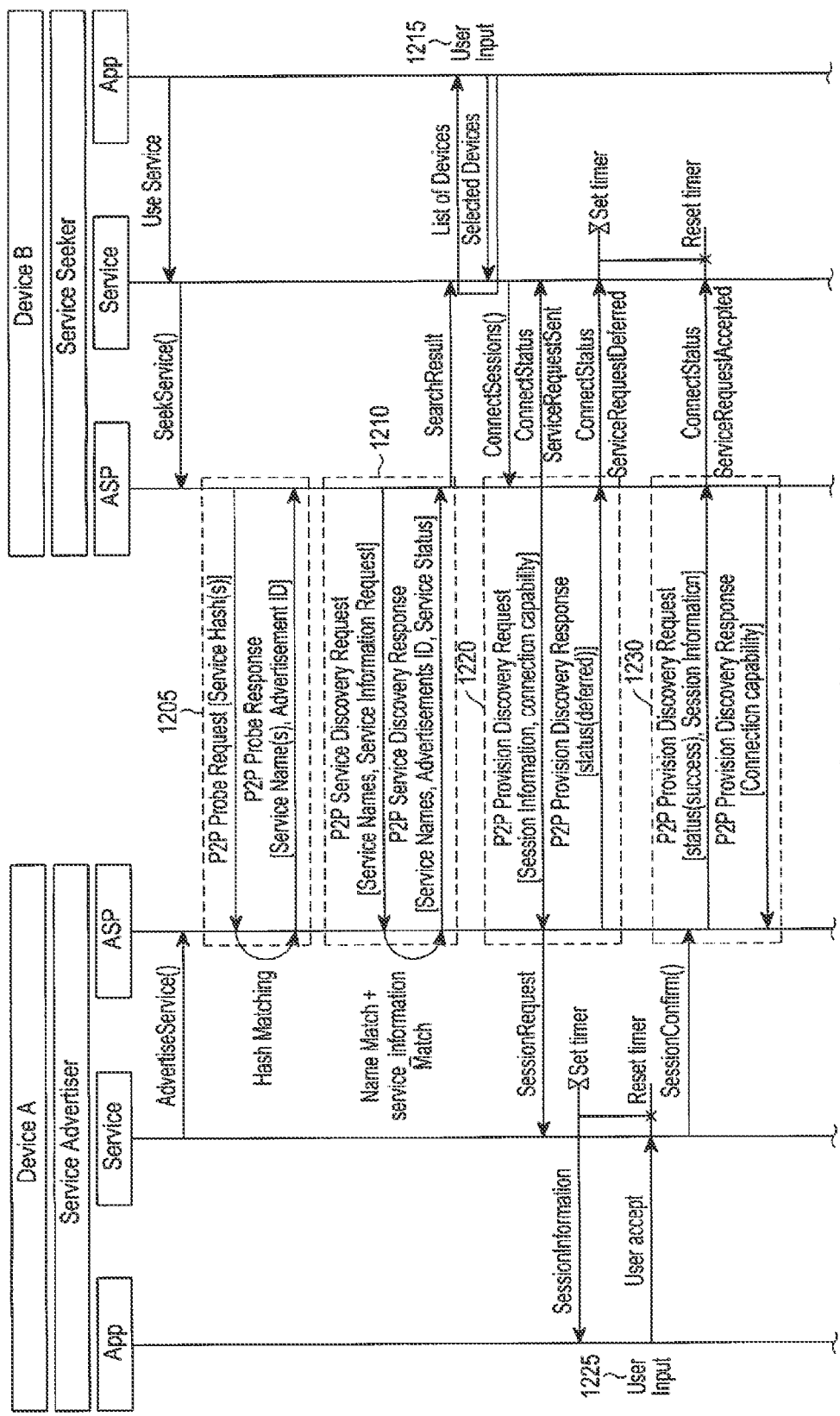
FIGS. 12A, 12B and 12C illustrate a procedure for providing a file transmission service through a Wi-Fi Direct connection according to an embodiment of the present invention.
Figure 12B:
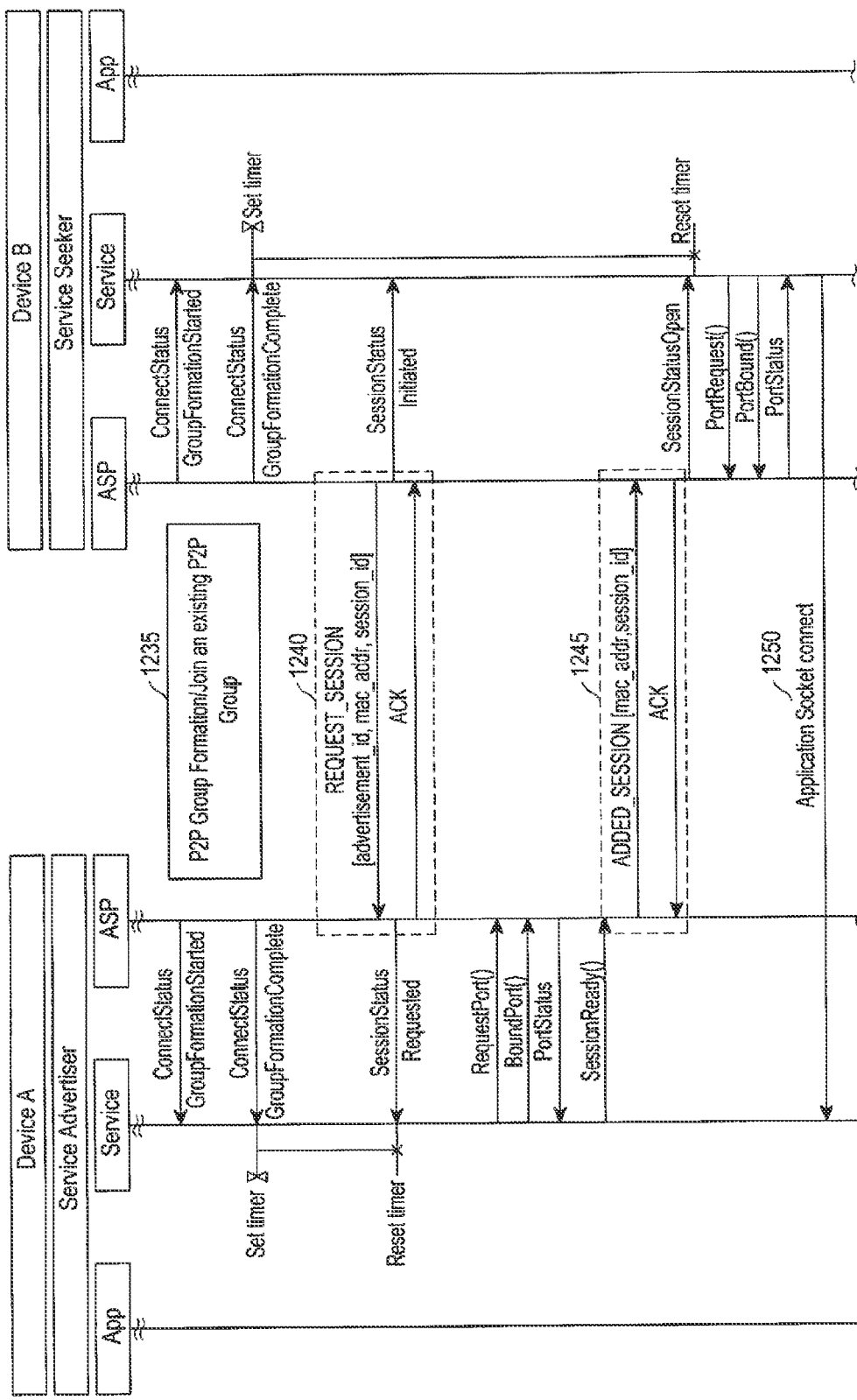
Figure 12C:
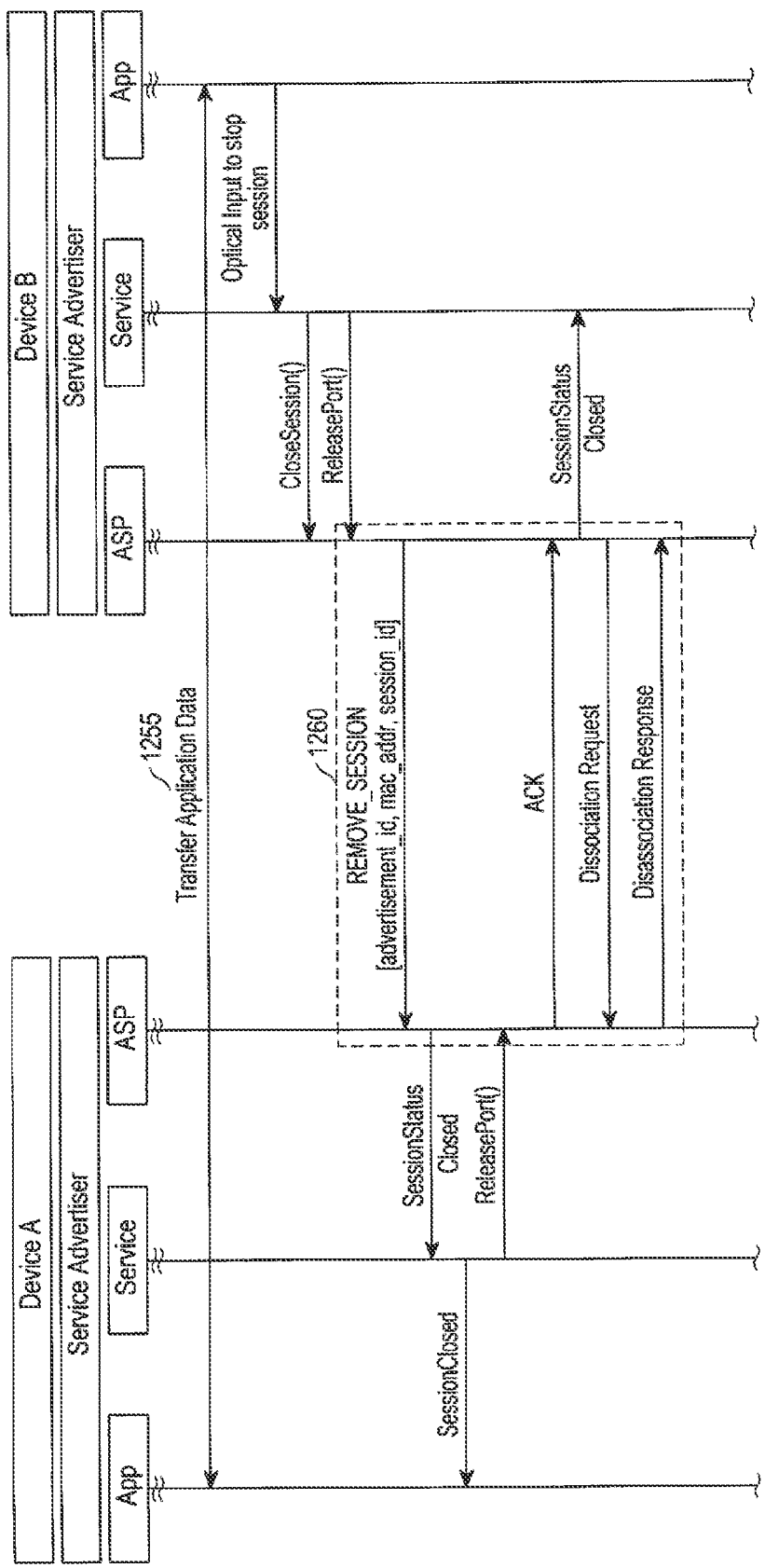

FIGS. 12A, 12B and 12C illustrate a procedure of providing a file transmission service through a Wi-Fi Direct connection according to an embodiment of the present invention. In FIGS. 12A, 12B and 12C, terminal A (i.e., Device A) acts as a service advertiser and terminal B (i.e., Device B) acts as a service seeker. In a file transmission service, terminal A is a receiving terminal and terminal B is a transmitting terminal. A connection is established between terminal A and terminal B through Wi-Fi P2P interfaces, which will not be illustrated in FIGS. 12A, 12B and 12C.

Referring to FIGS. 12A, 12B and 12C, in terminal A, a service process advertises a service(s) to an ASP by an AdvertiseService command so that another terminal, for example, terminal B may discover an ASP session related to the advertised service(s) and be initialized. When an application is executed and a service use command is generated to transmit a specific file in terminal B, a service process of terminal B transmits a SeekService command requesting service discovery to an ASP of terminal B. In response to the command, the ASP of terminal B transmits a P2P Probe Request with a hash value generated based on a service name to the ASP of terminal A in step 1205.

The ASP of terminal A judges whether the hash value of the service name to be advertised is matched to the hash value received in the P2P Probe Request. If the hash values are matched, the ASP of terminal A transmits a P2P Probe Response to the ASP of terminal B. The P2P Probe Response may include the service name confirmed by hash matching and the advertisement ID of the service to be advertised from terminal A.

In step 1210, the ASP of terminal B transmits the service name to be connected and a service information request, including additional information needed for service discovery, to terminal A through a P2P Service Discovery Request. The ASP of terminal A determines whether there is a string matched to the service name and service information received in the P2P Service Discovery Request. Upon detection of the matched string, the terminal A transmits a P2P Service Discovery Response including the name and advertisement ID of the service and a service status to the terminal B. The service status may indicate whether the terminal A accepts connection of the service.

The ASP of terminal B transmits, to the service process, a terminal list including at least one terminal, including the terminal A identified by the P2P Service Discovery Response. The service process indicates the terminal list to a user by the application. In step 1215, the application senses a user input that selects at least one terminal in the terminal list and notifies the service process of the selected terminal. The service process requests a session connection setup with the selected terminal to the ASP of terminal B.

In step 1220, the ASP of terminal B transmits a P2P Provision Discovery Request including session information, which represents file attribute information about one or more files to be transmitted and connection capabilities, to the ASP of terminal A and also transmits a ConnectStatus event indicating transmission of a service request to the service process of terminal B. The P2P Provision Discovery Request includes at least one of the number, total size, and names of the file(s), as the file attribute information. The ASP of terminal A may transmit to the ASP of terminal B a P2P Provision Discovery Response indicating successful reception of the P2P Provision Discovery Request, which includes a status code that requests deferral of a service request until a user input is confirmed. The ASP of terminal B transmits a ConnectStatus event indicating deferral of the service request to the service process. The service process of terminal B recognizes deferral of the service request until a user intention of terminal A is confirmed and activates a timer in response to the ConnectStatus event. The timer may be reset when a P2P Provision Discovery Request, indicating the user intention, is received from terminal A.

The ASP of terminal A notifies the service process of the session request in response to the P2P Provision Discovery Request received from terminal B. When needed, the service process of terminal A activates an application of the Wi-Fi Direct service and transmits session information with the file attribute information to the application.

In step 1225, the application of terminal A requests a user input by displaying information about the files on a screen based on the file attribute information read from the session information. Upon detection of a user input indicating acceptance of the file transmission service, the application notifies the service process of the user acceptance and the service process transmits a SessionConfirm command indicating confirmation of a session setup to the ASP of terminal A. When transmitting the session information to the application, the service process of terminal A may activate a timer. When a user input is received, the timer may be reset. In an embodiment of the present invention, if a user input has not been detected before expiration of the timer, the service process of terminal A may transmit a SessionConfirm command indicating acceptance of the file transmission service according to a presetting in the ASP.

In step 1230, the ASP of terminal A transmits a P2P Provision Discovery Request including a status code indicating acceptance and, when needed, the session information to the ASP of terminal B in response to the SessionConfirm command received from the service process. The ASP of terminal B provides a ConnectStatus event indicating acceptance of the service request to the service process and continuously performs the remaining operation of the session setup procedure.

Specifically, in step 1235 the ASPs of terminal A and terminal B form a P2P group or join an existing P2P group and report events of the start and end of group formation to their respective service processes.

In step 1240, the ASP of terminal B transmits a REQUEST SESSION including an advertisement ID, a Medium Access Control (MAC) address to be combined with a session ID in order to identify the ASP session, and the session ID allocated to the ASP of terminal A by the ASP of terminal B. The ASP of terminal A responds to the ASP of terminal B with an Acknowledgement (ACK). The ASP of terminal B transmits a SessionStatus event indicating session initialization to its service process and the ASP of terminal A transmits a SessionStatus event indicating a session request to its service process.

In step 1245, the ASP of terminal A operates to open a port for the service process and the session and transmits an ADDED_SESSION frame including the MAC address and the session ID to the ASP of terminal B. The ASP of terminal B responds to terminal A with an ACK and transmits a SessionStatus event indicating that the session is opened to its service process, thereby opening a port for the service process and the session. When the session is opened, the service process of terminal B transmits, to the service process of terminal A, an Application Socket Connect message through the session in step 1250.

In step 1255, the application of terminal B transmits application data (i.e., the files) to the application of terminal A.

If the application of terminal B transmits an input indicating session termination to the service process before or after the file transmission is completed, the service process of terminal B requests session close and port release to the ASP. In step 1260, the ASP of terminal B transmits a REMOVE_SESSION frame including the advertisement ID, the MAC address, and the session ID to indicate the session to be removed to the ASP of terminal A. The ASP of terminal A transmits a SessionStatus event indicating a session close request to the service process. After notifying the application of session termination, the service process transmits a ReleasePort command to the ASP. After receiving an ACK from the ASP of terminal A, the ASP of terminal B transmits a SessionStatus event indicating that the session is closed to the service process. After transmitting a Dissociation Request to the ASP of terminal A, the ASP of terminal B receives a Dissociation Response from the ASP of terminal A. If there is no further active session, the ASP of terminal A closes an incoming port, thus terminating all sessions.

As is apparent from the above description of the embodiments of the present invention, as a transmitting terminal transmits information about a file to be transmitted to a receiving terminal in advance, the receiving terminal can notify the transmitting terminal of a user's intention to accept or reject a Wi-Fi Direct connection based on the file information. Therefore, an unnecessary Wi-Fi connection setup is avoided and file transmission cancellation is reduced.

It should be noted that the embodiments of the present invention, as described above, typically involve the processing of input data and the generation of output data to some extent. This input data processing and output data generation may be implemented in hardware or software combined with hardware. For example, specific electronic components may be employed in a mobile device or similar or related circuitry for implementing the functions associated with the embodiments of the present invention, as described above. Alternatively, one or more processors operating in accordance with stored instructions may implement the functions associated with the embodiments of the present invention, as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be construed by programmers skilled in the art to which the present invention pertains.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of connecting a service, according to a user's intention, the method comprising:
   determining at least one file to be transmitted through a wireless connection;
   selecting a terminal, by device discovery, to receive the at least one file;
   transmitting a first frame, including file attribute information about the at least one file, to the terminal, before the wireless connection is established with the terminal; and
   receiving, from the terminal, a second frame including information indicating whether the wireless connection to the terminal is accepted or rejected.

2. The method of claim 1, further comprising performing service discovery after the device discovery.

3. The method of claim 1, further comprising:
   if the information included in the second frame indicates that the wireless connection is accepted, performing a remaining procedure of wireless connection setup and transmitting the at least one file to the terminal through the wireless connection.

4. The method of claim 1, further comprising:
   if the information included in the second frame indicates that the wireless connection is rejected, discontinuing wireless connection setup.

5. The method of claim 1, wherein the file attribute information includes at least one of a number, a total size, and a name of the at least one file to be transmitted.

6. The method of claim 1, wherein at least one of the first and second frames includes a Peer-to-Peer (P2P) provision discovery request frame.

7. The method of claim 1, further comprising deferring a remaining procedure of wireless connection setup until the second frame is received or until a time-out period has elapsed after the first frame is transmitted.

8. A method of connecting a service, according to a user's intention, the method comprising:
   determining a terminal from which at least one file will be received through a wireless connection by device discovery;
   receiving, from the terminal, a first frame, including file attribute information about the at least one file, before the wireless connection is established with the terminal; and
   transmitting, to the terminal, a second frame including information indicating whether the wireless connection to the terminal is accepted or rejected.

9. The method of claim 8, further comprising performing service discovery after the device discovery.

10. The method of claim 8, further comprising:
    if the information included in the second frame indicates that the wireless connection is accepted, performing a remaining procedure of wireless connection setup with the terminal and receiving the at least one file from the terminal through the wireless connection.

11. The method of claim 8, further comprising:
if the information included in the second frame indicates that the wireless connection is rejected, discontinuing wireless connection setup with the terminal.

12. The method of claim 8, wherein the file attribute information includes at least one of a number, a total size, and a name of the at least one file to be transmitted.

13. The method of claim 8, wherein at least one of the first and second frames includes a Peer-to-Peer (P2P) provision discovery request frame.

14. The method of claim 8, further comprising:
Transmitting, to the terminal, a frame requesting deferral of a remaining procedure of wireless connection setup until the second frame is transmitted or until time-out period has elapsed after the first frame is received.

15. The method of claim 8, further comprising:
at least one of providing the file attribute information to a user and detecting a user input indicating whether transmission of the at least one file is accepted or rejected, and
determining to reject the wireless connection if the user input is not detected until time-out of a predetermined time period.

16. A terminal for connecting a service, according to a user's intention, the terminal comprising:
a control unit configured to determine at least one file to be transmitted through a wireless connection and to select, by device discovery, a terminal to receive the at least one file;
a transmitting unit configured to transmit a first frame, including file attribute information about the at least one file, to the terminal, before the wireless connection is established with the terminal; and
a receiving unit configured to receive, from the terminal, a second frame, including information indicating whether the wireless connection to the terminal is accepted or rejected.

17. A terminal for connecting a service, according to a user's intention, the terminal comprising:
a control unit configured to determine, by device discovery, a terminal from which at least one file will be received through a wireless connection;
a receiving unit configured to receive, from the terminal, a first frame including file attribute information about the at least one file, before the wireless connection is established with the terminal; and
a transmitting unit configured to transmit to the terminal a second frame including information indicating whether the wireless connection to the terminal is accepted or rejected.

* * * * *